May 21, 1968        D. RUFF        3,384,032
SEMI-AUTOMATIC LOCOMOTIVE CONTROL SYSTEM
Filed Aug. 31, 1964        2 Sheets-Sheet 1
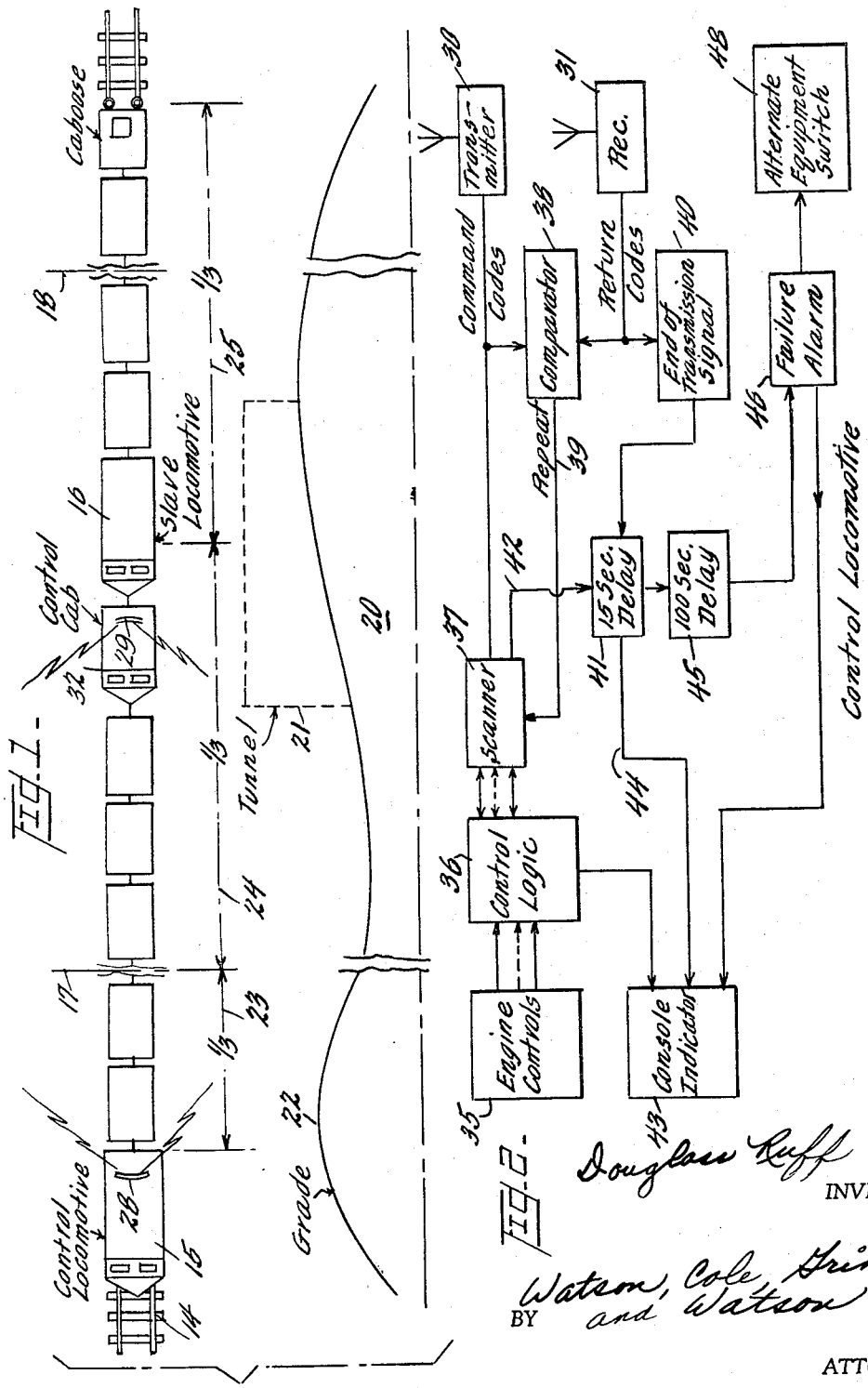
Douglass Ruff
INVENTOR
BY Watson, Cole, Grindle and Watson
ATTORNEY May 21, 1968           D. RUFF           3,384,032
SEMI-AUTOMATIC LOCOMOTIVE CONTROL SYSTEM
Filed Aug. 31, 1964           2 Sheets-Sheet 2
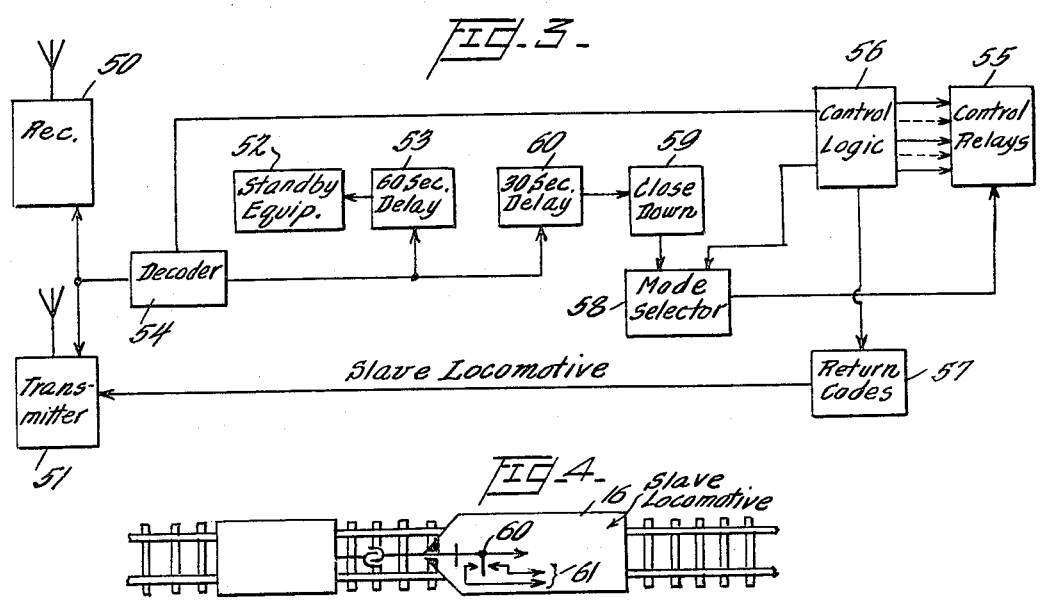
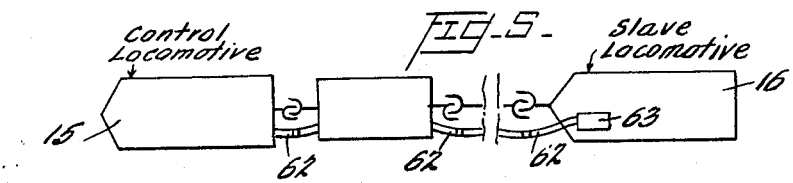
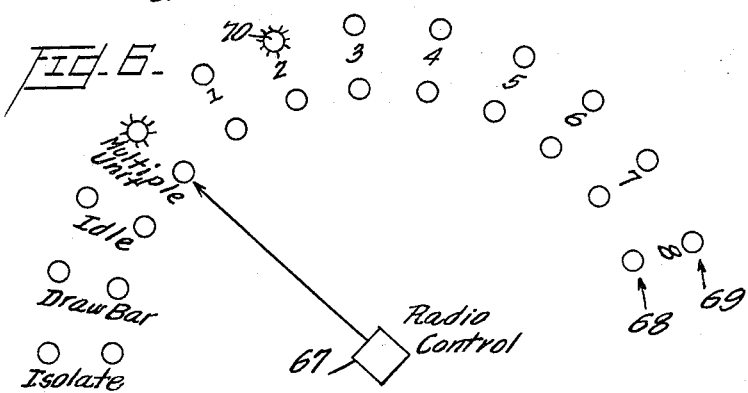
Douglass Ruff
INVENTOR
BY Watson, Cole, Grindle & Watson
ATTORNEY

United States Patent Office 3,384,032
Patented May 21, 1968

3,384,032
SEMI-AUTOMATIC LOCOMOTIVE
CONTROL SYSTEM
Douglass Ruff, 2716 Blaine Drive,
Chevy Chase, Md. 20015
Filed Aug. 31, 1964, Ser. No. 393,440
2 Claims. (Cl. 105—61)

This invention relates to methods and apparatus for electronic control of locomotives in a train and more particularly it relates to the provision of a fail-safe communication system between a manned lead locomotive and an unmanned amid-train helper locomotive to effectuate control of the train under various conditions of operation.

One or more helper locomotives positioned one third of the distance from the rear of the train has been used to assist the lead locomotive(s) and has afforded greater speeds when pulling trains over grades and has improved performance of the air brakes. However, attempts to control remotely an unmanned locomotive located amid-train have led to a significant number of problems. If dynamic braking and throttle controls are identically set on lead and helper locomotives or otherwise are not properly positioned to prevent slack between cars, a whiplash effect is frequently encountered which breaks the train couplers, particularly at the crest of hills. While proper control of the train at times requires different throttle and dynamic braking settings on the lead and amid-train locomotives, air brake settings on the lead (control) locomotive and the amid-train locomotive should be identical.

Other conditions of mismatch of throttle and dynamic braking controls can occur which lead to unsatisfactory performance. An unmanned system that is radio-controlled, for example, may temporarily lose control when one of the locomotives passes through a tunnel, or a communication link may fail from other causes so that signals between the two locomotives do not set up the necessary conditions. This might result in a malfunction on the amid-train locomotive, which could, for example, pull the train in two or cause the train to stall.

An essential feature of any train control system is control of the air brakes. The air brakes are operated by pneumatic pressure pumped through the train from the engine to provide the proper level of pressure such as 75 pounds per square inch in local tanks mounted on each car. In long trains the tank pump-up time becomes significant, and upon application of the brakes a finite time delay is encountered after the braking control is initiated which, because of long pneumatic lines and air leakage, results in uneven application of the air brakes.

While uneven application is undesirable, uneven release resulting from time delay can be disastrous. When brake release is initiated on a long train, the brakes on the head cars release before those on the rear, and often this results in a broken coupling. Improvements in effectiveness of braking and a decrease of braking time are desirable qualities in a locomotive control system.

Therefore it is an object of the invention to provide an improved control system for an unmanned amid-train locomotive.

Another object of the invention is to provide fail-safe control of an automated locomotive over various conditions encountered in use.

Yet another object of the invention is to provide improved braking (air and dynamic) control of a train including an unmanned amid-train locomotive.

A further object of the invention is to provide fail-safe radio or inductive or other controls between a lead locomotive and an amid-train unmanned locomotive.

These and other objects and features of the invention are embodied in a communication and control link between a manned lead control locomotive and an unmanned amid-train helper slave locomotive wherein braking and throttle settings in the helper locomotive are controlled by settings which may be manual or automatic, on the lead locomotive. The control system comprises a two-way radio or other control link which provides continuous periodic two-way communication between the two locomotives to verify the control positions in effect at the helper locomotive and to indicate the results to the engineer in the lead locomotive control cab.

In accordance with one aspect of the invention, a single helper locomotive is located one-third of the way from the rear of the train to improve the braking function and to thereby effectuate faster braking control through the communication link. The radio control system is supplemented by both pneumatic control signals and indications of the relative loads borne by the respective locomotives, which operate in conjunction with and in the absence of radio control signals to provide several modes of controlled operation which may be established to meet various conditions encountered in train operation. All controls are thereby contained within the train and associated communication link between the lead and helper locomotives.

Interlock, release and override controls are built in to phase controls automatically between different operating modes. This permits full or partial control by the lead locomotive and serves to adjust the system for optimum performance in the event of loss of communication or other failure conditions.

A system embodiment of the invention illustrating the various principles afforded therein is described with reference to the accompanying drawing, wherein:

FIGURE 1 is a diagrammatic view of a train as used in accordance with the invention with an accompanying grade chart used to illustrate some of the operating conditions encountered in service;

FIGURE 2 is a simplified block diagram of control means associated with that part of the system afforded by the invention in the control locomotive;

FIGURE 3 is a simplified block diagram of complementary control means associated with the same locomotive;

FIGURE 4 is a diagrammatic sketch of a coupling slack sensing device used in accordance with the invention;

FIGURE 5 is a diagrammatic sketch of a pneumatic sensing means employed in accordance with the principles of the invention; and FIGURE 6 is a diagram of a control panel operable by the engineer in the lead locomotive to control the train.

Referring now to FIGURE 1, the representative train displayed along tracks 14 has a lead control locomotive 15, which is manned, and an amid-train unmanned helper or slave locomotive 16. The train may contain typically 200 cars and the sketch is broken at line 17, 18 to allow for variable train length and to avoid unecessary detail in the drawing.

The accompanying graph 20 illustrates a corresponding grade profile along the track 14 of a long train, somewhat exaggerated to point out some of the conditions encountered by a train in service. A tunnel 21 is diagrammatically shown at one point and the crest of a hill 22 at another point along the grade.

In accordance with one feature of the invention, the length of the train is divided up into thirds 23, 24, 25 and the helper locomotive 16 is located two thirds of the way back in the train. This feature is important in the braking functions of the train. Consider, for example, the matter of pumping up the local pressure tanks in a train of 200 cars from the lead locomotive 15. Because of losses at couplings, the unequal pressures at various local tanks and the length of the train it will take approximately 52 minutes to pump. A significant improvement in pump up time can result from positioning a helper locomotive in the center-rear of the train.

For example, the improvement factor in time for pump-up appears to be a factor $N = f(x)^3$, where $x$ is a term indicating the number of equal segments of the length of the train. Referring to FIGURE 1, a train with slave locomotive(s) at one location in the train would have three segments, for instance, segments 23, 24, and 25. While it is essential that the length of the segments measured in feet be approximately equal, the lengths do not seem to be critical.

By positioning the single helper locomotive 16 two-thirds of the way to the rear of the train, the pumping distance in the brake lines is reduced to one-third, and $N = (3)^3 = 27$. Thus, using a 200 car train as an example, pump-up time becomes 52/27 minutes or aproximately two minutes. This reaction may be considered simply by recognizing that with the chosen locomotive positions, the lead locomotive 15 need only supply pressure to pump-up the front third of the train or approximately 66 cars. The helper locomotive also needs pump the length of the same 66 cars to the rear and toward the fronts, so that the effective braking length of the train is 66 cars rather than 200 cars for the full train if the helper is at the head end or 100 cars if the helper locomotive were located in the center of the train. In the same manner, the time it takes to effectively brake the train is improved whenever the pneumatic brakes are operated, so that control of the helper locomotive 16 to apply the brakes concurrently with the control locomotive affords improved safety provided the helper locomotive 16 is properly positioned. Even greater improvement would be attained by use of more helper locomotives distributed through the train to produce even shorter equal control segments.

Further advantages are attained from the optimum positioning of the helper locomotive. Thus, when brakes are applied it takes a finite time for the brakes to engage as air reduction is passed from the engine toward the rear of the train. Similarly, as the brakes are released the brakes are disengaged first at the head end of the train. Thus, in a train with only lead locomotives, it is possibel to pull the train in two as the slack is taken up car by car and the strain on the draw heads becomes greater toward the front cars of a long train. The amid-train helper locomotive serves to effectively decrease the length of the train releasing the brakes faster to thus reduce the maximum strain encountered, so that it is no longer required to completely stop the train after brakes are applied to prevent broken couplings.

Also, in pulling a long train about a curve, the flange resistance becomes a significant factor, and optimum positioning of a helper locomotive permits an increase in tonage haulable by reducing the flange resistance. Furthermore, better speed control is afforded over hills with less likelihood of pulling the train in two at the crest of a hill, since the two engines may run at different throttle or brake control settings to avoid the creation of whiplash or increased drawbar pull as the lead engine passes the crest of the hill and tends to increase speed on the downward grade. If most of a long train is past the crest 22 of a hill, the tendency to increase speed on the downgrade will cause greater drawbar strain in the lead cars because of the load of the remaining cars being pulled up to the crest of the hill, and the helper locomotive may be used to even out the drawbar load most efficiently at the shown location, which effcetively makes the train one third the overall length.

When radio controls are set up between the two locomotives 15 and 16 for controlling the unmanned or slave helper locomotive 16, as evidenced by radio antennas 28, 29 on the respective locomotives, radio control may be lost when one or the other locomotive enters the tunnel 21. Thus the radio control system must include safeguards and interlocks against loss of communication. Also, the controls should provide for the possibility of different throttle or brake settings at each locomotive and possible failure of the radio link. Under all these conditions, the engineer in the manned lead locomotive 15 must be aware of the condition of the slave locomotive since he must control the train in a different manner when the helper is not in use. Therefore, in the hereinafter described system an indicator panel is provided in the control cab of the lead locomotive 15 for continuously signalling the condition of the slave locomotive controls to the engineer in the lead locomotive.

A block diagram of the control system is broken down in FIGURES 2 and 3 to show the equipment located respectively in the control locomotive and the slave locomotive.

The control locomotive has both a radio transmitter 30 and a receiver 31 to afford two way communication with the corresponding receiver 50 and the transmitter 51 in the slave locomotive. The respective locomotives therefore are outfitted with the special control equipment shown in the block diagrams to permit proper control between the two locomotives via the radio communication link. However, since this equipment is not standard for all locomotives, the radio control equipment for the slave locomotive is preferably, but not necessarily, located in a relatively inexpensive but universal control cab 32 (FIGURE 1) which can be coupled to the slave locomotive 16 by conventional electric cables to effectuate control in accordance with this invention. When a control cab is used, any diesel locomotive can be used as a slave; no modifications are required. This arrangement simplifies diesel maintenance and locomotive scheduling and assignments. The control cab 32 can be continuously used and is infrequently serviced, so that efficiency of operational equipment is greatly enhanced by this expedient, which required relatively few control cabs as compared with the required number of special slave locomotives.

Now considering the lead locomotive equipment of FIGURE 2, the transmitter 30 periodically sends out a group of coded signals derived from engine controls such as brake and throttle settings typified by block 35. These settings are coded in the control logic section 36 and are scanned periodically by scanner 37 to provide command codes for transmission at transmitter 30. The command codes for each transmission are stored in comparator 38 for matching with return codes received by receiver 31. Thus, the slave locomotive settings are checked after the command codes are given by a return transmission from transmitter 51 (FIGURE 3) of the return codes. If the return codes do not match, a repeat transmission cycle is initiated through scanner 37 by lead 39 to reestablish the control cycle.

To assure that the communication link has not failed in any way, an end-of-transmission code is transmitted from the slave locomotive transmitter 51, and is decoded in the control locomotive unit 40. If this is not received within 15 seconds as timed from timer 41 initiated by scanner lead 42, an alarm lamp for "no continuity" is lighted in the control console indicator panel 43 by way of lead 44. This can happen for example if one of the locomotives is passing through a tunnel, and the engineer in the lead locomotive thus is made aware that the slave locomotive may not be in proper control.

Should the repeat commands 39 be made and the lack of an end-of-transmission signal persist for 100 seconds as timed in unit 45, an equipment failure alarm 46 is actuated to switch in a complete set of alternate standby equipment 48 automatically.

Similarly, the slave locomotive equipment of FIGURE 3 has standby equipment 52 actuated through the 60 second delay timer 53 if the end of transmission signal from decoder 54 is not received properly from the control locomotive.

The slave locomotive throttle and brake controls are actuated by relays in control section 55 as instructed by the control logic circuitry 56. Return codes are transmitted back to the control locomotive through section 57 as instructed by the control logic circuitry 56.

In the slave locomotive several modes of operation are afforded as indicated by mode selector 58. One mode of operation is the passive or no-control condition, and this may be automatically entered by a step by step closedown procedure afforded in section 59 whenever a thirty second delay in timer 60 is encountered after the end-of-transmission signal. This returns full control of the train to the engineer at the lead control locomotive, which is signaled on his console indicator by the aforedescribed end-of-transmission alarm signal.

The mode selector also may control operation of the slave locomotive responsive to radio control signals or responsive to the functioning of pressure in the air brake line as affected by the detectors of FIGURES 4 and 5.

Slack at the slave locomotive is detectable by means of a draw bar control switch 60 which indicates whether the slave locomotive is pushing or being pulled by respective contact with one or the other of leads 61. These leads 61 may be used respectively to step the throttle control forward or backward one position in order to cause the switch 60 to remain in midposition where the slave locomotive is neither pushing the car in front, nor being pulled by it. This is the draw-bar mode of control which may be established optionally by the engineer or automatically when radio continuity is lost.

A complementary control is the pneumatic or air line control of FIGURE 5. The cars of the train between the lead control locomotive 15 and slave locomotive 16 are coupled by the air brake line 62. If the brake setting on the slave locomotive is improperly controlled and does not follow as the brakes in the control locomotive are applied by reducing pressure in the line 62, the slave will attempt to pump up line 62. This will establish a flow of air toward the control locomotive 15 sensed in air flow detector 63 at the slave locomotive 16. The signal is used to inactivate all controls in the slave locomotive 16 and pass complete control to the engineer at the lead locomotive 15.

Operational control of the train by the engineer in the lead locomotive is typified by the control panel shown in FIGURE 6. The brake control 65 and throttle control 66 represent conventional diesel locomotive controls, which are mechanically interlocked so that the throttle must be off before the brakes are applied and vice versa. Each control has eight positions. The radio control has a rotary switch 67 which encompasses twelve control positions, each having two levels 68, 69 of indicator lamps.

The rotary switch 67 thus determines the mode of operation. In isolate position full control is afforded at the lead locomotive. Draw-bar control is effected in the next position. The idle control position provides for fixed controls in the slave locomotive. Full radio control in "multiple unit" provides for the slave locomotive to follow all control settings in the control locomotive. Manual override of a throttle or braking condition can be effected by moving to one of the positions 1 through 8, since the brake and the throttle may not be used together.

In the typical position shown the radio control 67 being in multiple unit and the brake 65 at setting 2, lamp 70 in the upper row of lamps 69 indicates the reply code from the slave locomotive with brakes on in setting 2. Similarly, the lower row of lamps 68 would indicate throttle setting.

Thus the present invention has afforded improvements in train controls which produce better control over braking and resolve many ambiguities existing in prior art control equipment. Thus, trains may be operated efficiently and reliably in accordance with the features afforded by this invention, as defined with particularly in the appended claims.

What is claimed is:

1. The method of improvement in braking controls for a train comprising, providing a lead locomotive, placing a single helper locomotive amid-train in a position substantially two-thirds of the way back from the lead locomotive, coupling a single airline throughout the train, pumping up the single airline from each locomotive to a predetermined pressure and jointly controlling the brakes through said airline by combined braking action at the two locomotives.

2. The method of improving braking controls in a train having a single airline connected along the length of the train comprising the steps of providing a lead locomotive, connecting a plurality of $n$ amid-train helper locomotives to said air line each at separate locations, dividing the train into $2n+1$ substantially equal lengths, establishing said separate helper locomotive locations between two adjacent ones of said equal lengths with two of said equal lengths separating the lead locomotive from the first helper locomotive thereby minimizing the air line from each locomotive, pumping up the single airline from each locomotive to a predetermined pressure and jointly controlling the brakes through said airline by combined braking action at the various locomotives.

References Cited

UNITED STATES PATENTS

| 3,217,663 | 11/1965 | Hughson | 105—1 |
| 3,217,662 | 11/1965 | Hughson et al. | 105—1 |
| 2,977,896 | 4/1961 | Hammond | 105—61 |
| 2,937,907 | 5/1960 | Harris et al. | 246—30 X |
| 1,900,408 | 3/1933 | Sorensen | 246—182 |
| 1,786,815 | 12/1930 | Aspinwall | 246—187 X |

FOREIGN PATENTS 1,277,755   10/1961   France.

ARTHUR L. LA POINT, *Primary Examiner.*

S. B. GREEN, S. T. KRAWCZEWICZ,
*Assistant Examiners.*